United States Patent [19]

Mouri et al.

[11] Patent Number: 4,756,961
[45] Date of Patent: Jul. 12, 1988

[54] RECORDING MEMBER AND RECORDING METHOD USING THE SAME

[75] Inventors: Hidemasa Mouri; Michiaki Tobita, both of Yokohama; Naonobu Eto, Fujisawa, all of Japan

[73] Assignee: Canon Kabushiki Kaisha, Tokyo, Japan

[21] Appl. No.: 735,695

[22] Filed: May 20, 1985

[30] Foreign Application Priority Data

May 25, 1984 [JP] Japan ................................. 59-105964
May 25, 1984 [JP] Japan ................................. 59-105965

[51] Int. Cl.$^4$ ................................................ B32B 5/16
[52] U.S. Cl. ................................. 428/323; 346/135.1; 428/195; 428/207; 428/324; 428/327; 428/328; 428/329; 428/330; 428/331; 428/334; 428/335; 428/336; 428/340; 428/341; 428/363; 428/401; 428/402
[58] Field of Search ............... 428/207, 211, 195, 323, 428/327, 328, 329, 330, 331, 334–336, 212, 324, 340, 341, 363, 401, 402; 346/135.1

[56] References Cited

U.S. PATENT DOCUMENTS

| 4,446,174 | 5/1984 | Maekawa | 428/211 |
| 4,460,637 | 7/1984 | Miyamoto et al. | 428/211 |
| 4,474,850 | 10/1984 | Burwasser . | |
| 4,550,053 | 10/1985 | Arai et al. | 428/195 |

FOREIGN PATENT DOCUMENTS

| 0083552 | 7/1983 | European Pat. Off. . |
| 2132415 | 1/1973 | Fed. Rep. of Germany . |
| 3222455 | 3/1983 | Fed. Rep. of Germany . |
| 3237380 | 7/1983 | Fed. Rep. of Germany . |
| 1500038 | 9/1967 | France . |
| 1582480 | 9/1969 | France . |
| 2257738 | 8/1975 | France . |
| 2543062 | 9/1984 | France . |
| 0525620 | 9/1940 | United Kingdom . |
| 0767007 | 1/1957 | United Kingdom . |

Primary Examiner—John E. Kittle
Assistant Examiner—P. R. Schwartz
Attorney, Agent, or Firm—Fitzpatrick, Cella, Harper & Scinto

[57] ABSTRACT

A light-transmissive recording member comprises a light-transmissive substrate and an ink acceptor provided on said substrate, wherein powdery particles are imparted onto the surface of said ink acceptor.

7 Claims, No Drawings

RECORDING MEMBER AND RECORDING METHOD USING THE SAME

BACKGROUND OF THE INVENTION

1. Field of the Invention

This invention relates to a recording member to be used for recording with an ink, and more particularly to a recording member which is particularly suitable for recording of images which are observed by projection on a screen by means of an optical instrument such as an OHP (overhead projector) utilizing the transmitted light through the recorded image and further suitable for ink-jet recording.

This invention also relates to a method for effecting recording by use of an ink on a light-transmissive recording member, and more particularly to a method capable of recording an image, which is clear and good in resolution, and can be used for applications utilizing light-transmitted through the image, according to smooth recording operations without contamination of the ink-receiving layer.

2. Description of the Prior Art

Recording systems with the use of a recording liquid (ink) may include generally, for example, fountain pens, aqueous ball pens, felt pens, etc. and further, as the recording systems attracting attention in these days, the ink-jet recording system in which small droplets are generated by various kinds of actuating principles and attached onto a recording member to effect recording thereon.

The ink-jet recording system is characterized by the generation of very little noise during recording and the capability of high speed recording and multi-color recording.

In such a recording system, from aspects of safety and recording efficacy, aqueous inks have primarily been employed.

As the recording member to be used for such a recording system as mentioned above, conventional papers have heretofore been employed. Whereas, for the recording member to be used for an ink-jet recording system, higher characteristics are coming to be demanded with improvement of performance of the ink-jet recording device enabling high speed recording or multi-color recording.

Thus, for obtaining recorded images of high resolution and high quality, the recording member to be used for ink-jet recording system is required to have the following characteristics.

(1) To be as rapid as possible in absorption and fixing of ink.

(2) When ink dots overlap, the ink attached later should not flow out into the ink dot previously attached.

(3) The shape of ink dot should be a true circle with an even periphery.

(4) The density of ink dot should be high, without obscurity around the dot.

(5) The color forming characteristic of the ink should be excellent.

Thus, recorded images by ink-jet recording have been employed for observation of surface images on one hand, while a recording member is now demanded, which can utilize the recorded images by ink-jet recording for uses other than surface image observation, on the other.

The uses other than surface image observation may include those in which recorded images are projected by means of optical instruments such as slides or OHP (overhead projector) on a screen, etc. for observation, contact printer, photomask of print substrate, color separating plate during preparation of posi-plate for color printing, CMF (color mosaic filter) for color display of liquid crystal, etc.

While the diffused light of a recorded image is primarily observed when the recorded image is to be used for surface image observation, the transmitted light passing through the recorded image is primarily observed or utilized for various kinds of uses in a recording member to be used in these uses. Accordingly, the recording member to be used for these uses is required to be sufficient in light transmitting characteristics in addition to the performance as described above. In the prior art, as the recording member to be used for uses as mentioned above, there have been known recording members, comprising a light-transmissive substrate and an ink acceptor provided on said substrate, having especially excellent light transmittance and ink absorption property among the requisite characteristics as previously mentioned.

For the material forming the ink acceptor in such a recording member, various materials have been employed. In view of the relationship with the aqueous ink employed as mentioned above, hydrophilic materials such as polyamide, polyvinyl alcohol are attracting attention as materials which can impart excellent ink absorbability to the ink acceptor.

Whereas, when an ink acceptor is formed of a material having hydrophilic properties as mentioned above, moisture in the air will also be absorbed to make the material disadvantageously sticky, whereby dust, etc. will readily be attached onto the surface of the recording member. Further, various inconveniences have been observed, such as sticking (blocking) between recording members when stocked in a pile, attachment of fingerprints when touched during handling or sticking between the recording member and the recording member delivering roller when performing recording with the recording member mounted on the recording device, whereby making delivery of the recording member unstable or making it impossible to feed the recording device.

In addition, in the ink acceptor possessed by the recording member as mentioned above, it is not generally possible to obtain an adequate degree of blurring of ink and it has been difficult to control expansion (blurring) of the ink dot to a desired size when carrying out ink-jet recording.

SUMMARY OF THE INVENTION

It is, therefore, an object of the present invention to provide a recording member, which satisfies sufficiently the requisite characteristics as mentioned above, being particularly excellent in ink absorbability and light-transmittance, further free from stickiness on the ink acceptor surface, and is applicable for uses observing or utilizing the transmitted light through recorded images by means of an optical instrument such as OHP, contact printer, etc., and also suitable for ink-jet recording.

It is another object of the present invention to provide a recording method by use of an ink, which is capable of performing smooth recording operation even when employing the ink-jet recording method without contamination of the ink acceptor surface by cancelling the stickiness on the surface of the ink acceptor possessed by a light-transmissive recording member and also capable of recording an image which is clear and high in resolution, and can be used in uses other than surface observation, namely optical instruments utilizing transmitted light through recorded images such as slide, OHP, contact printer, etc.

According to one aspect of the present invention, there is provided a light-transmissive recording member, which comprises a light-transmissive substrate and an ink acceptor provided on said substrate, wherein powdery particles are imparted onto the surface of said ink acceptor.

According to another aspect of the present invention, there is provided a recording method, which comprises the step of previously attaching powdery particles on the surface of the ink acceptor of a light-transmissive recording member having a light-transmissive substrate and an ink acceptor provided on said substrate and the step of effecting recording by attaching ink on the ink acceptor, on which said powdery particles are attached, by a recording means.

These and other objects of the invention will become more apparent in the description and examples which follow.

DESCRIPTION OF THE PREFERRED EMBODIMENTS

The recording member of the present invention has a light-transmissive substrate and an ink acceptor provided on the substrate having a surface on which recording is to be effected, namely the surface capable of absorbing ink, and is particularly excellent in light-transmittance and ink absorbability, the ink acceptor having powdery particles imparted on its surface, whereby the stickiness, that is to say, the tacky nature of the surface can be suppressed by the powdery particles attached on the surface, and yet the degree of blurring of ink on the ink acceptor surface can be controlled within a suitable range by controlling the amount of the powdery particles attached on the surface.

As the substrate possessed by the recording member of the present invention, there may be employed those excellent in light transmittance such as films or plates made of plastics such as polyester, diacetate, triacetate, acrylic polymer, cellophane, celluloid, polyvinyl chloride, polycarbonate, polyimide, etc., or glass plates and others, which can suitably be selected depending on various conditions such as the purpose of recording, uses of the recorded image or whether good adhesion can be obtained with the ink acceptor provided thereon.

The ink acceptor possessed by the recording member of the present invention is the portion which receives and absorbs ink from a recording means of a recording device or recording implement at the time of recording.

The ink acceptor possessed by the recording member of the present invention can be formed by use of at least one material, which is capable of forming a continuous coat having sufficient light transmittance on the above substrate, has affinity for ink, namely hydrophilic property forms an ink acceptor with good ink absorbability and also can form a surface on which powdery particles as mentioned below can be attached, including, for example, natural products such as starch, cationic starch, albumin, gelatin, gum arabic, sodium alginate, etc. and synthetic resins such as polyamide, polyacrylamide, polyvinylpyrrolidone, quaternized polyvinylpyrrolidone, polyethyleneimine, polyvinylpyridinium halide, melamine resin, polyurethane, polyvinyl alcohol, etc.

Further, since a dye is generally employed as the recording agent component of the ink for ink-jet recording, it is also possible to mix the above mentioned light-transmissive substance which can constitute the ink acceptor of the recording member as mentioned above with a material having dye fixing ability for further improvement of the recording agent fixing characteristic of the ink acceptor. As the materials having such dye fixing ability, there may be employed at least one dye fixing agent selected from cationic surfactants such as lauryl trimethylammonium chloride, octadecylamine acetate, etc., dicyan diamide, copper-containing dye fixing agents and others, if desired. Most of such materials having dye fixing ability are cationic, and hence the aforesaid light transmissive substance should preferably be a neutral or cationic polymer, but it is also possible to use an anionic resin, if both are not reactive with each other.

For further enhancement of the recording characteristic of the recording member, fillers such as silica, clay, talc, diatomaceous earth, calcium carbonate, calcium sulfate, barium sulfate, aluminum silicate, synthetic zeolite, alumina, zinc oxide, lithopone, satin white, etc. may also be dispersed in the ink acceptor to the extent which will not impair the light transmission of the recording member. Further, for more improvement of productivity, recording characteristic and storage stability of the recording member, it is also possible to incorporate various additives such as dispersants, fluorescent dyes, pH controllers, defoaming agents, lubricants, preservatives, etc. These additives are also added to the extent which will not impair the light transmission of the recording member.

In the present invention, onto the surface of the ink acceptor are imparted a predetermined amount of powdery particles to be attached thereon.

The powdery particles as herein mentioned refer to microparticulate fine grain materials capable of forming powder, having a particle size preferably of 20 $\mu$m or less. This is because particles with too great sizes can give no good attaching force of the powdery particles onto the ink acceptor surface, and also involve undesirable problems such as impairment of light transmission of the recording member or failure to give adequate dot shape.

In the present invention, as the material capable of constituting the powdery particles to be imparted onto the surface of the ink acceptor of the present invention, there may be included inorganic materials such as silicic acid, aluminum silicate, calcium silicate, clay, talc, diatomaceous earth, calcium carbonate, calcium sulfate, barium sulfate, titanium oxide, zeolite, alumina, zinc oxide, lithopone, mica, satin white, magnesium carbonate, etc., and also organic materials such as plastic pigments, benzoguanamine resin, acrylic resin, etc. As the powdery particles to be imparted onto the surface of the ink acceptor in the present invention, at least one of the powdery particles selected from those as mentioned above may suitably be combined depending on the adhering fitness to the material constituting the above ink acceptor, namely so that the powder may not be released from the ink acceptor surface during recording or other handlings.

The recording member of the present invention can be formed by use of various kinds of materials, by first providing an ink acceptor on a substrate and then attaching the powdery particles onto the surface of said ink acceptor.

For provision of an ink acceptor on a substrate, a coating solution prepared by dissolving or dispersing a material capable of forming the ink acceptor in a suitable solvent may be applied according to such a method as roll coating, blade coating, spray coating, air knife coating, rod bar coating, etc., followed by drying. Alternatively, a mixture in which the materials capable of forming the aforesaid ink acceptor are homogeneously mixed may be laminated on the above mentioned light-transmissive substrate according to hot melt coating, laminate coating, etc. to form an ink acceptor thereon. The layer thickness of the ink acceptor possessed by the recording member of the present invention is desired to be generally about 1 to 200 μm, preferably about 5 to 80 μm. If the thickness of the ink acceptor is too thick, light transmission (straight line transmittance) will be lowered, while making it too thin will undesirably result in lowering in ink absorbability.

Next, in the present invention, as the method for imparting and attaching powdery particles onto the surface of the ink acceptor possessed by the recording member, there may be employed the method in which the necessary amount of the powdery particles are sprayed directly onto the desired surface of the ink acceptor, the method in which they are absorbed by electrostatic adsorption or the method in which powdery particles are suspended or dispersed in necessary amount in an appropriate liquid, and then applied on the ink acceptor surface by way of dipping, brush coating, spraying, coating roller coating, etc., followed by drying.

The amount of the powdery particles to be attached on the ink acceptor surface and their distribution on said surface should be selected suitably within the range which will not impair the light transmission of the recording member, depending on the various conditions such as the extent of stickiness of the material forming the ink acceptor, the desired ink absorbability of the ink acceptor under the state where the powder is attached on the surface of the ink acceptor or the extent of blurring of the ink, etc. Accordingly, the amount of the above powdery particles to be attached on the ink acceptor surface, which will vary with individual cases depending on the physical properties of the ink acceptor, the powdery particles imparted onto the ink acceptor and the ink used for recording, may preferably be selected from within the range of from 10 to 1000 mg/m$^2$, more preferably from 20 to 500 mg/m$^2$. Thus, if the amount of the powdery particles attached on the ink acceptor surface is generally over 1000 mg/m$^2$, the ink attached on the ink acceptor surface may become blurred too much, whereby all of the powdery particles cannot be adhered sufficiently onto the ink acceptor surface and a part thereof becomes readily released from the ink acceptor surface. As the result, various inconveniences may be caused, such as contamination of the recording device with powdery particles, excessive slidability on the ink acceptor surface which may cause slippage of the delivery roller of the recording member to result in failure of good operation of delivering the recording member, and further impairment of light transmission of the recording member. On the other hand, with an amount less than 10 mg/m$^2$, there are involved disadvantageously problems such that the desired tack-free effect of the ink acceptor cannot be obtained, and also that it becomes difficult to control blurring of the ink attached on the ink acceptor.

As described above, the surface of the ink acceptor of the recording member of the present invention is imparted with a predetermined amount of powdery particles, and the powdery particles attached on the ink acceptor cancel stickiness of the ink acceptor surface simultaneously with imparting good ink absorbability to the ink acceptor surface when the powder is porous, and the extent of expansion (blurring) of the ink dots in the ink acceptor can be controlled optimally by controlling the amount and distribution of the powdery particles.

On the other hand, the recording member of the present invention must be sufficient in light transmitting characteristic of the recording member, in order to be used for uses utilizing transmitted light through the images recorded on said recording member, for example, optical instruments such as slide, OHP, contact printer, etc.

For example, when the projected image of the recorded image is observed by means of OHP as a typical example of the optical instrument, it is required that the contrast between the recorded portion and the non-recorded portion should be high, and also that, in order to obtain an image which is clear and can easily be viewed, the non-recorded portion in the projected image should be light, namely the straight line light transmittance through the recording member should be at a level of a certain value or higher. In order to obtain the image suited for the above object from the test according to the test chart in OHP, namely in order that the lines with pitch width of 0.5 mm and thickness of 0.25 mm can clearly be discriminated from each other, the straight line light transmittance through the recording member is required to be 2% or more, preferably to obtain a more clear projected image, 10% or more. Accordingly, the light-transmitting recording member as mentioned in the present invention refers to a recording member having the total straight line transmittance of the light-transmissive substrate and the ink accepto of 2% or more, preferably 10% or more.

The straight line light transmittance (T %) as mentioned in the present invention refers to the spectral transmittance of the straight line light, which entered a sample perpendicularly, transmitted through the sample, passed through the slit on the light-receiving side at a distance of at least 8 cm apart from the sample on the line elongated from the incident optical path and was received at the detector, as measured by means of, for example, Model 323 Hitachi Self-Recording spectrophotometer (mfd. by Hitachi Co., Ltd.) and further determined from the measured spectral transmittance according to the following formula with the use of Y values of the tristimulus values of color:

$$T = Y/Y_0$$

T: straight line transmittance;
Y: Y value of sample;
$Y_0$: Y value of blank.

Thus, the straight line light transmittance is relative to the straight line light, and the method for evaluation of the light transmitting characteristic of the recording member by use of straight line light transmittance is different from the methods for evaluation of light transmitting characteristic by use of diffused light such as diffuse transmittance (transmittance inclusive also of diffused light is determined by providing an integrating sphere at the rear portion of the sample) or opacity (white and black backings are lined on the back of the sample, and the opacity is determined from the ratio of both cases). The problems in the instruments utilizing optical technique are caused primarily through behaviors of straight line light, and therefore it is particularly important to determine the straight line light transmittance of a recording member for evaluation of the light transmitting characteristic of th recording member to be used for these instruments.

The recording member of the present invention is not necessarily required to exhibit colorless transparency but it may also be a recording member exhibiting colored transparency.

The recording members according to the present invention as described above have satisfactory light transmitting characteristic, being particularly excellent in ink fixing characteristic which has been inferior in the recording members of the prior art such as light transmitting film, to enable high speed printing and multicolor printing by ink-jet recording, and therefore they are very suitable as record-bearing members for using the recorded images for uses other than surface observation, namely optical instruments utilizing the transmitted light through recorded images, such as slide, OHP, contact printer, etc.

Further, because of the powdery particles attached on the surface of the ink acceptor of the recording member of the present invention, stickiness of the surface of the ink acceptor is cancelled, simultaneously with good ink absorbability of the ink acceptor surface in the case when the powdery particles are porous, and the extent of expansion of ink dots on the ink acceptor can be controlled optimally by controlling the amount and the distribution of the powdery particles.

The recording method of the present invention includes the two principal steps, namely the step of previously imparting the powdery particles to the surface of the ink acceptor where recording is to be effected during recording (the surface which receives ink) and the step of attaching ink onto the ink acceptor surface, on which the powdery particles are attached, by a recording means.

The recording member to be used in the method of the present invention can be formed by use of the materials as described in detail above.

In the method of the present invention, as the next step, recording is effected by attaching ink by various kinds of recording means on the ink acceptor surface having such a surface state.

As the recording means to be employed in the method of the present invention, there may be included those which perform recording by use of an aqueous ink, for example, writing implements such as fountain pen, aqueous ball pen, felt pen, etc., and further ink-jet recording devices.

In carrying out recording by such recording means as mentioned above, the ink acceptor surface is under non-sticky state as described above, and therefore better ink-absorbability can be obtained even when performing recording by use of, for example, fountain pen, aqueous ball pen or felt pen, whereby fingerprints will hardly be attached on the ink acceptor surface even when touched, thereby preventing contamination of the surface.

Also, even when performing recording by means of an ink jet recording device, adhesion between the recording member and the rollers for delivery of the recording member can be prevented, whereby smooth recording operation may be possible without unstable or difficulties in delivery of the recording member.

Further by appropriately controlling the amount of the above-mentioned particulate material attached on the ink acceptor surface, the extent of expansion of the ink dots on the ink acceptor can be controlled optimally, whereby it has been rendered possible to record a clear and highly resolved image.

As described above, according to the recording method of the present invention, smooth recording operations can be performed, while cancelling the stickiness of the ink acceptor possessed by the light-transmissive recording member, without contamination of the ink acceptor surface. Moreover, good ink absorbability can be given to the ink acceptor and also, when employing an ink-jet recording device, good expansion of ink dots can be obtained. Consequently, the image recorded according to the method of the present invention becomes a clear and highly resolved image which can be used in uses other than surface observation, namely in optical instruments utilizing transmitted light through recorded images such as slide, OHP, contact printer, etc.

The present invention is described in more detail by referring to the followlng Examples and Comparative Examples.

EXAMPLE 1

Using a polyethyleneterephthalate film with a thickness of 100 $\mu$m (produced by ICI Co.) as the light-transmissive substrate, a coating solution having the composition as shown below was applied on the substrate by the blade coater method to a dried film thickness of the ink acceptor of 20 $\mu$m, followed by drying under the conditions of 80° C. and 20 minutes, to form an ink acceptor.

| Coating solution composition: | |
|---|---|
| Polyvinyl pyrrolidone K-30 (trade name: K-30, produced by GAF Co.) | 50 wt. parts |
| Benzylidene sorbitol (trade name: Gelol D, produced by Shinnippon Rika Co.) | 5 wt. parts |
| Dimethylformamide | 45 wt. parts |

Next, the ink acceptor surface was tapped with a cotton bag containing talc powder with an average particle size of 6 $\mu$m (trade name: Talc SWS, produced by Tsuchiya Kaolin Co.) to have talc attached on the surface of the ink acceptor, thus providing a recording member of the present invention which can be used for uses utilizing transmitted light through recorded image. The amount of the powder particles attached on the ink acceptor surface of the recording member obtained was found to be 200 mg/m$^2$.

On the recording member obtained, ink-jet recording was effected by means of the recording device having an on-demand type ink-jet recording head which discharged ink through a piezo-vibrator (ink discharging orifice diameter: 65 $\mu$m, piezo-vibrator driving voltage: 75 V, frequency: 2.5 KHz) with the use of inks of four colors as shown below, to obtain a recorded image.

[Ink composition]

Yellow ink

| | |
|---|---|
| C.I. Acid Yellow 23 | 2 wt. parts |
| Diethylene glycol | 15 wt. parts |
| Water | 85 wt. parts |

Red ink

| | |
|---|---|
| C.I. Acid Red 37 | 2 wt. parts |
| Diethylene glycol | 15 wt. parts |
| Water | 85 wt. parts |

Blue ink

| | |
|---|---|
| C.I. Direct Blue 86 | 2 wt. parts |
| Diethylene glycol | 15 wt. parts |
| Water | 85 wt. parts |

Black ink

| | |
|---|---|
| C.I. Direct Black 19 | 2 wt. parts |
| Diethylene glycol | 15 wt. parts |
| Water | 85 wt. parts |

For the recorded image thus obtained, the five items as shown below were tested for evaluation of recording characteristics and the optical instrument efficacy of the recording member.

(1) Ink fixing time was evaluated by measuring the period in which the ink was dried without being attached on the finger, when the recording memeber after recording was left to stand under the conditions of 20° C. and 65% RH or 20° C. and 90% RH and the recorded image was touched with a finger.

(2) Straight line light transmittance was measured for evaluation of light transmitting characteristic as one evaluation of optical instrument efficacy, and calculated from the spectral transmittance as defined above measured for the recording member before practicing recording by means of Model 323 Hitachi Self-Recording Spectrophotometer.

(3) The ink dot density was measured for black dots recorded under the conditions of 20° C. and 65% RH by means of Sakura Micro Densitometer PDM-5 )produced by Konishiroku Shashin Kogyo K.K.) by applying JIS K 7605 for printed letter microdots.

(4) OHP efficacy was measured as a typical example of optical instrument efficacy of the recording member and judged by observation of the recorded image which was projected on a screen by OHP, with the non-recorded portion being light and the recorded image giving a clear projected image of high OD (optical density) and high contrast which can be easily viewed being rated as O, with the non-recorded portion slightly dark and the recorded image with slightly lower OD, showing lines with pitch width of 0.5 mm and thickness of 0.25 mm which could not clearly be discriminated from each other being rated as Δ; with the non-recorded portion which is considerably dark and the recorded image showing lines with pitch width of 1 mm and thickness of 0.5 mm which could not clearly be discriminated from each other or the recorded image which could not be discriminated from the non-recorded portion being rated as x.

(5) Blocking characteristic was tested by applying a load of 500 g on 50 sheets of recording members piled, which was then left to stand a whole day and night under the conditions of 30° C. and 90% RH, and observing generation of blocking. The case when no blocking was generated was rated as O, while the case when blocking was generated as x.

Further, on the basis of these results, the recording members obtained in this Example were comprehensively evaluated. In this evaluation, those which enable good recording operation by means of a recording device while satisfying various characteristics as the recording member wholly without exhibiting stickiness on the ink acceptor surface are rated as (O), those which, while satisfying various characteristics as the recording member wholly, exhitits stickiness on the ink-receiving layer surface, and cannot effect recording due to adhesion with rollers for delivering recording member, etc. when performing recording under the conditions of 20° C. and 90% RH as (Δ), and those which cannot perform recording operation smoothly due to stickiness on the ink acceptor surface even when recording is carried out under the conditions of 20° C. and 65% RH as (x).

The results obtained are shown in Table 1.

EXAMPLE 2

Using a triacetate film with a thickness of 100 μm (produced by Fuji Photofilm) as the light-transmissive substrate, a coating solution having the composition as shown below was applied on the substrate by the blade coater method to a dried film thickness of the ink acceptor o 10 μm, followed by drying under the conditions of 100° C. and 20 minutes to form an ink acceptor.

| Coating solution composition: | |
|---|---|
| Polyvinyl alcohol | 10 wt. parts |
| (trade name: PVA-210, produced by Kuraray) | |
| Polyethyleneimine | 0.5 wt. parts |
| (trade name: P-1000, produced by Nippon Shokubai Kagaku) | |
| Water | 45 wt. parts |

Next, on the ink acceptor surface was applied by spray coating a suspension containing 5 wt. % of anhydrous silicon dioxide powder with an average particle size of 30 mμm (trade name: Aerosil MOX80, produced Nippon Aerosil Co.) suspended in methanol, followed by drying, to obtain a recording member which can be used for uses utilizing transmitted light through recorded image.

The amount of the powder particles attached on the ink acceptor surface of the recording member was found to be 80 mg/m².

On the recording member obtained, ink-jet recording by use of four colors was performed similarly as in Example 1 to obtain a recorded image.

For the recorded image thus obtained, recording characteristics and optical instrument efficacy were evaluated similarly as in Example 1 to obtain the results as shown in Table 1.

EXAMPLE 3

Using a polyester film with a thickness of 100 μm (produced by ICI Co.) as the light-transmissive substrate, a coating solution having the composition as shown below was applied by a wire bar to a dried film thickness of the ink acceptor of 30 μm, followed by drying to form an ink acceptor.

| [Coating solution composition] | |
|---|---|
| Polyvinyl pyrrolidone | 10 wt. parts |
| (trade name: K-30, produced by GAF Co.) | |
| Polyvinyl alcohol | 10 wt. parts |
| (trade name: PVA-220, produced by Kuraray) | |
| Water | 80 wt. parts |

Next, on the ink acceptor surface of the recording member thus prepared, diatomaceous earth with an average particle size of 3 μm (trade name: Super Floss, produced by Tsuchiya Kaolin Co.) was attached by electrostatic adsorption to obtain a recording member of the present invention.

The amount of the powdery particles attached on the ink acceptor surface of the recording member obtained was found to be 300 mg/m$^2$.

On the recording member obtained was effected the ink-jet recording by use of inks of four colors similarly as in Example 1 to obtain a recorded image.

For the recorded image thus obtained, recording characteristics and optical instrument efficacy were evaluated similarly as in Example 1 to obtain the results as shown in Table 1.

EXAMPLE 4

Example 3 was repeated except that the coating solution as shown below was used and aluminium hydroxide fine powder (trade name: Hygillite H-40, average particle size: 1.5 μm, produced by Showa Keikinzoku) was attached as the powdery particles in an amount of 600 mg/m$^2$ on the ink acceptor surface, to prepare a recording member of the present invention.

| [Coating solution composition] | |
|---|---|
| Carboxymethyl cellulose (trade name: Cellogen BS, produced by Daiichi Kogyo Co.) | 2 wt. parts |
| Water | 10 wt. parts |

On the recording member obtained was effected the ink-jet recording by use of inks of four colors similarly as in Example 1 to obtain a recorded image For the recorded image thus obtained, recording characteristics and optical instrument efficacy were evaluated similarly as in Example 1 to obtain the results as shown in Table 1.

EXAMPLE 5

Example 3 was repeated except that the coating solution as shown below was used and Nipsil E200 (trade name, average particle size: 2.5 μm, produced by Nippon Silica Kogyo Co.) was attached as the powdery particles in an amount of 400 mg/m$^2$ on the ink acceptor surface, to prepare a recording member of the present invention.

| [Coating solution composition] | |
|---|---|
| Styrene-maleate Na salt (trade name: Discoat KS-140, produced by Daiichi Kogyo Co.) | 10 wt. parts |
| Water | 90 wt. parts |

On the recording member obtained was effected the ink-jet recording by use of inks of four colors similarly as in Example 1 to obtain a recorded image.

For the recorded image thus obtained, recording characteristics and optical instrument efficacy were evaluated similarly as in Example 1 to obtain the results as shown in Table 1.

EXAMPLE 6

Example 3 was repeated except that the coating solution as shown below was used and zeolite powder (trade name: Zeo-49, average particle size: 5 μm, produced by J. M. Huber Corp.) was attached as the powdery particles in an amount of 200 mg/m$^2$ on the ink acceptor surface, to prepare a recording member of the present invention.

| [Coating solution composition] | |
|---|---|
| Hydrophilic urethane (trade name: Toricoat G, produced by Taiho Industries Co. Ltd.) | 80 wt. parts |
| Methyl ethyl ketone | 20 wt. parts |

On the recording member obtained was effected the ink-jet recording by use of inks of four colors similarly as in Example 1 to obtain a recorded image.

For the recorded image thus obtained, recording characteristics and optical instrument efficacy were evaluated similarly as in Example 1 to obtain the results as shown in Table 1.

EXAMPLE 7

Example 3 was repeated except that the coating solution as shown below was used and Syloid #161 (trade name, average particle size: 7 μm, produced by Fuji-Davison Chemical Ltd.) was attached as the powdery particles in an amount of 100 mg/m$^2$ on the ink acceptor surface, to prepare a recording member of the present invention.

| [Coating solution composition] | |
|---|---|
| Water-soluble acrylic resin (trade name: Cogum HW-7, produced by Showa Kobunshi Co.) | 20 wt. parts |
| Water | 80 wt. parts |

On the recording member obtained was effected the ink-jet recording by use of inks of four colors similarly as in Example 1 to obtain a recorded image.

For the recorded image thus obtained, recording characteristics and optical instrument aptitude were evaluated similarly as in Example 1 to obtain the results as shown in Table 1.

EXAMPLE 8

Example 3 was repeated except that the coating solution as shown below was used and Aerosil R972 (trade name, average particle size: 15 μm, produced by Nippon Aerosil Co.) was attached as the powdery particles in an amount of 50 mg/m$^2$ on the ink acceptor surface, to prepare a recording member of the present invention.

| [Coating solution composition] | |
|---|---|
| Water-soluble acrylic resin (trade name: Cogum HW-7, produced by Showa Kobunshi Co.) | 10 wt. parts |
| Acrylic resin emulsion (trade name: S-100A, produced by Showa Kobunshi Co.) | 10 wt. parts |
| Water | 70 wt. parts |

On the recording member obtained was effected the ink-jet recording by use of inks of four colors similarly as in Example 1 to obtain a recorded image.

For the recorded image thus obtained, recording characteristics and optical instrument efficacy were evaluated similarly as in Example 1 to obtain the results as shown in Table 1.

COMPARATIVE EXAMPLES 1-3

In Examples 1-3, the films before attachment of powdery particles were employed as the recording member, and ink-jet recording was performed similarly as in Example 1. The resultant recorded images were evaluated for recording characteristics and optical instrument efficacy of the recording members similarly as in Example 1. The results obtained are shown in Table 2.

EXAMPLE 9

Using an ink-jet recording device (ink discharging orifice diameter: 65 μm, piezo-vibrator driving voltage: 75 V, frequency: 2.5 KHz) as the recording means, recording was effected on the light-transmissive recording member with the use of inks of four colors according to the method of the present invention.

The recording member used in this Example was prepared by applying a coating solution having the composition as shown below on a polyethyleneterephthalate film with a thickness of 100 μm (produced by ICI Co.) as the light-transmissive substrate by the blade coater method to a dried film thickness of the ink acceptor of 20 μm, followed by drying under the conditions of 80° C. and 20 minutes, to form an ink acceptor.

| [Coating solution composition] | |
|---|---|
| Polyvinyl pyrrolidone K-30 (trade name: K-30, produced by GAF Co.) | 50 wt. parts |
| Benzylidene sorbitol (trade name: Gelol D, produced by Shinnippon Rika Co.) | 5 wt. parts |
| Dimethylformamide | 45 wt. parts |

Next, the ink acceptor surface of the recording member thus prepared was tapped with a cotton bag containing talc powder with an average particle size of 6 μm (trade name: Talc SWS, produced by Tsuchiya Kaolin Co.) to have talc attached on the surface of the ink acceptor. The amount of the powder particles attached on the ink acceptor surface of the recording member obtained was found to be 200 mg/m$^2$.

On the surface of the ink acceptor on which talc powder had been attached, recording was effected by means of the ink-jet recording device described above with the use of inks of four colors as shown below, to obtain a recorded image.

| [Ink composition] | |
|---|---|
| Yellow ink | |
| C.I. Acid Yellow 23 | 2 wt. parts |
| Diethylene glycol | 15 wt. parts |
| Water | 85 wt. parts |
| Red ink | |
| C.I. Acid Red 37 | 2 wt. parts |
| Diethylene glycol | 15 wt. parts |
| Water | 85 wt. parts |
| Blue ink | |
| C.I. Direct Blue 86 | 2 wt. parts |
| Diethylene glycol | 15 wt. parts |
| Water | 85 wt. parts |
| Black ink | |
| C.I. Direct Black 19 | 2 wt. parts |
| Diethylene glycol | 15 wt. parts |
| Water | 85 wt. parts |

In Table 1, there are shown the recording characteristics of the recording member of this Example and the results of the evaluation of the image characteristics for the image recorded thereon. The evaluation for each of the items shown in Table 3 was conducted according to the following methods.

(1) Ink fixing time was evaluated by measuring the period in which the ink was dried without being attached on the finger, when the recording member after recording was left to stand under the conditions of 20° C. and 65% RH or 20° C. and 90% RH and the recorded image was touched with a finger.

(2) Straight line light transmittance was measured for evaluation of light transmitting characteristic as one evaluation of optical instrument efficacy, and calculated from the spectral transmittance as defined above measured for the recording member before practicing recording by means of Model 323 Hitachi Self-Recording Spectrophotometer.

(3) The ink dot density was measured for black dots recorded under the conditions of 20° C. and 65% RH by means of Sakura Micro Densitometer PDM-5 (produced by Konishiroku Shashin Kogyo K.K.) by applying JIS K 7650 for printed letter microdots.

(4) OHP aptitude was measured as a typical example of optical instrument efficacy of the recorded image and judged by observation of the recorded image which was projected on a screen by OHP, with the non-recorded portion being light and the recorded image giving a clear projected image of high OD (optical density) and high contrast which can be easily viewed being rated as O; with the non-recorded portion slightly dark and the recorded image with slightly lower OD, showing lines with pitch width of 0.5 mm and thickness of 0.25 mm which could not clearly be discriminated from each other being rated as Δ; with the non-recorded portion which is considerably dark and the recorded image showing lines with pitch width of 1 mm and thickness of 0.5 mm which could not clearly be discriminated from each other or the recorded image which could not be discriminated from the non-recorded portion being rated as x.

(5) Blocking characteristic was tested by applying a load of 500 g on 50 sheets of piled recording members not subjected to recording, which was then left to stand a whole day and night under the conditions of 30° C. and 90% RH, and observing generation of blocking. The case when no blocking was generated was rated as O, while the case when blocking was generated as x.

Further, on the basis of these results, overall evaluation was carried out. In the overall evaluation, those which afford a recorded image which is excellent in ink-jet recording characteristics and has sufficient light transmittance and optical device efficacy and which enable good recording operation by means of a recording device while satisfying various characteristics as the recording member wholly without exhibiting stickiness on the ink acceptor surface of the recording member are rated as O, those which, while having satisfactory recording characteristics takes relatively much time to fix ink, and cannot effect satisfactory recording due to adhesion with rollers for delivering recording member, etc. when performing recording under the conditions of 20° C. and 90% RH as Δ, and those which cannot perform recording operation smoothly due to stickiness on the ink acceptor surface even when recording is carried out under the conditions of 20° C. and 65% RH as x.

The results obtained are shown in Table 3.

EXAMPLE 10

A recording member was prepared by applying a coating solution having the composition as shown below on a triacetate film with a thickness of 100 μm (produced by Fuji Photofilm) as the light-transmissive substrate by the blade coater method to a dried film thickness of the ink acceptor of 10 μm, followed by drying under the conditions of 100° C. and 20 minutes to form an ink acceptor.

| [Coating solution composition] | |
|---|---|
| Polyvinyl alcohol (trade name: PVA-210, produced by Kuraray) | 10 wt. parts |
| Polyethyleneimine (trade name: P-1000, produced by Nippon Shokubai Kagaku) | 0.5 wt. parts |
| Water | 45 wt. parts |

Next, on the ink acceptor surface of the recording member thus prepared was applied by spray coating a suspension containing 5 wt. % of anhydrous silicon dioxide powder with an average particle size of 30 mμm (trade name: Aerosil MOX80, produced Nippon Aerosil Co.) suspended in methanol, followed by drying. The amount of the powder particles attached on the ink acceptor surface of the recording member was found to be 80 mg/m$^2$.

On the ink acceptor of the recording member on which silicon dioxide powdery particles had been attached, ink-jet recording by use of four colors was performed similarly as in Example 9 to obtain a recorded image.

For the recording member thus obtained, recording characteristics and image characteristics of the recorded image were evaluated similarly as in Example 9 to obtain the results as shown in Table 3.

EXAMPLE 11

A recording member was prepared by applying a coating solution having the composition as shown below on a polyester film with a thickness of 100 μm (produced by ICI Co.) as the light-transmissive substrate by a wire bar to a dried film thickness of the ink acceptor of 30 μm, followed by drying to form an ink acceptor.

| [Coating solution composition] | |
|---|---|
| Polyvinyl pyrrolidone (trade name: K-30, produced by GAF Co.) | 10 wt. parts |
| Polyvinyl alcohol (trade name: PVA-220, produced by Kuraray) | 10 wt. parts |
| Water | 80 wt. parts |

Next, on the ink acceptor surface of the recording member thus prepared, distomaceous earth with an average particle size of 3 μm (trade name: Super Floss, produced by Tsuchiya Kaolin Co.) was attached by electrostatic adsorption.

The amount of the powdery particles attached on the ink acceptor surface of the recording member obtained was found to be 300 mg/m$^2$.

On the ink acceptor of the recording member on which diatomaceous earth had been attached was effected the ink-jet recording by use of inks of four colors similarly as in Example 9 to obtain a recorded image.

For the recording member thus obtained, recording characteristics and image characteristics of the recorded image were evaluated similarly as in Example 9 to obtain the results as shown in Table 3.

EXAMPLE 12

Ink-jet recording was carried out similarly as in Example 11 except that the coating solution as shown below was used to form the ink acceptor and Hygillite H-40 (trade name, average particle size: 1.5 μm, produced by Tsuchiya Kaolin Co.) was attached as the powdery particles in an amount of 600 mg/m$^2$ on the ink acceptor surface of the recording member prepared, to obtain a recorded image.

| [Coating solution composition] | |
|---|---|
| Carboxymethyl cellulose (trade name: Cellogen BS, produced by Daiichi Kogyo Co.) | 2 wt. parts |
| Water | 10 wt. parts |

Recording characteristics of the recording member thus obtained and image characteristics of the recorded image were evaluated similarly as in Example 9 to obtain the results as shown in Table 3.

EXAMPLE 13

Ink-jet recording was carried out similarly as in Example 11 except that the coating solution as shown below was used to form the ink acceptor and Nipsil E200 (trade name, average particle size: 2.5 μm, produced by Nippon Silica Kogyo Co.) was attached as the powdery particles in an amount of 400 mg/m$^2$ on the ink acceptor surface of the recording member prepared, to obtain a recorded image.

| [Coating solution composition] | |
|---|---|
| Styrene-maleate Na salt (trade name: Discoat KS-140, produced by Daiichi Kogyo Co.) | 10 wt. parts |
| Water | 90 wt. parts |

Recording characteristics of the recording member thus obtained and image characteristics of the recorded image were evaluated similarly as in Example 9 to obtain the results as shown in Table 3.

EXAMPLE 14

Ink-jet recording was carried out similarly as in Example 11 except that the coating solution as shown below was used to form the ink acceptor and Zeolite powder (trade name: Zeo-49, average particle size: 5 μm, produced by J. M. Huber Corp.) was attached as the powdery particles in an amount of 200 mg/m$^2$ on the ink acceptor surface of the recording member prepared, to obtain a recorded image.

| [Coating solution composition] | |
|---|---|
| Hydrophilic urethane (trade name: Toricoat G, produced by Taiho Industry Co., Ltd.) | 80 wt. parts |
| Methyl ethyl ketone | 20 wt. parts |

Recording characteristics of the recording member thus obtained and image characteristics of the recorded image were evaluated similarly as in Example 9 to obtain the results as shown in Table 3.

EXAMPLE 15

Ink-jet recording was carried out similarly as in Example 11 except that the coating solution as shown below was used to form the ink acceptor and Syloid #161 (trade name, average particle size: 7 μm, produced by Fuji-Davison Chemical Ltd.) was attached as the powdery particles in an amount of 100 mg/m² on the ink acceptor surface of the recording member prepared, to obtain a recorded image.

| [Coating solution composition] | |
| --- | --- |
| Water-soluble acrylic resin (trade name: Cogum HW-7, produced by Showa Kobunshi Co.) | 20 wt. parts |
| Water | 80 wt. parts |

Recording characteristics of the recording member thus obtained an image characteristics of the recorded image were evaluated similarly as in Example 9 to obtain the results as shown in Table 3.

EXAMPLE 16

Ink-jet recording was carried out similarly as in Example 11 except that the coating solution as shown below was used to form the ink acceptor and Aerosil R972 (trade name, average particle size: 15 mμm, produced by Nippon Aerosil Co.) was attached as the powdery particles in an amount of 50 mg/m² on the ink acceptor surface of the recording member prepared, to obtain a recorded image.

| [Coating solution composition] | |
| --- | --- |
| Water-soluble acrylic resin (trade name: Cogum HW-7, produced by Showa Kobunshi Co.) | 10 wt. parts |
| Acrylic resin emulsion (trade name: S-100A, produced by Showa Kobunshi Co.) | 20 wt. parts |
| Water | 70 wt. parts |

Recording characteristics of the recording member thus obtained and image characteristics of the recorded image were evaluated similarly as in Example 9 to obtain the results as shown in Table 3.

COMPARATIVE EXAMPLES 4–6

In Examples 9–11, ink-jet recording was performed similarly as in Example 9 except that the step of attachment of powdery particles was omitted.

Recording characteristics of the recording member thus obtained and image characteristics of the recorded image were evaluated similarly as in Example 9. The results obtained are shown in Table 4.

TABLE 1

| | Straight line transmittance (%) | Ink fixing time | | Dot density | OHP aptitude | Blocking characteristic 30° C. 65% RH | Overall evaluation |
| --- | --- | --- | --- | --- | --- | --- | --- |
| | | 20° C. 65% RH | 20° C. 90% RH | | | | |
| Example 1 | 58 | 15 sec. | 20 sec. | 0.5 | | | |
| Example 2 | 78 | 2 min. | 3 min. | 0.8 | | | |
| Example 3 | 68 | 3 min. | 2 min. and 40 sec. | 0.9 | | | |
| Example 4 | 63 | 1 min. | 2 min. | 0.8 | | | |
| Example 5 | 65 | 1 min. | 2 min. and 20 sec. | 0.9 | | | |
| Example 6 | 68 | 1 min. | 2 min. | 0.8 | | | |
| Example 7 | 70 | 25 sec. | 40 sec. | 0.7 | | | |
| Example 8 | 73 | 15 sec. | 30 sec. | 0.7 | | | |

TABLE 2

| | Straight line transmittance (%) | Ink fixing time | | Dot density | OHP aptitude | Blocking characteristic 30° C. 65% RH | Overall evaluation |
| --- | --- | --- | --- | --- | --- | --- | --- |
| | | 20° C. 65% RH | 20° C. 90% RH | | | | |
| Comparative example 1 | 64 | 17 sec. | Sticky, recording impossible | 0.6 | | X | Δ |
| Comparative example 2 | 83 | 3 min. | Sticky, recording impossible | 0.8 | | X | Δ |
| Comparative example 3 | 78 | 3 min. | Sticky, recording impossible | — | — | X | X |

TABLE 3

| | Straight line transmittance (%) | Ink fixing time | | Dot density | OHP aptitude | Blocking characteristic 30° C. 65% RH | Overall evaluation |
| --- | --- | --- | --- | --- | --- | --- | --- |
| | | 20° C. 65% RH | 20° C. 90% RH | | | | |
| Example 9 | 58 | 15 sec. | 20 sec. | 0.5 | | | |
| Example 10 | 78 | 2 min. | 3 min. | 0.8 | | | |
| Example 11 | 68 | 3 min. | 2 min. and 40 sec. | 0.9 | | | |
| Example 12 | 63 | 1 min. | 2 min. | 0.8 | | | |
| Example 13 | 65 | 1 min. | 2 min. and 20 sec. | 0.9 | | | |
| Example 14 | 68 | 1 min. | 2 min. | 0.8 | | | |
| Example 15 | 70 | 25 sec. | 40 sec. | 0.7 | | | |
| Example 16 | 73 | 15 sec. | 30 sec. | 0.7 | | | |

TABLE 4

| | Straight line transmittance (%) | Ink fixing time | | Dot density | OHP aptitude | Blocking characteristic 30° C. 65% RH | Overall evaluation |
| --- | --- | --- | --- | --- | --- | --- | --- |
| | | 20° C. 65% RH | 20° C. 90% RH | | | | |
| Comparative example 4 | 64 | 17 sec. | Sticky, recording impossible | 0.6 | | X | Δ |
| Comparative example 5 | 83 | 3 min. | Sticky recording impossible | 0.8 | | X | Δ |
| Comparative example 6 | 78 | 3 min. | Sticky recording impossible | — | — | X | X |

What is claimed is:

1. A light-transmissive recording member, which comprises:

a light transmissive substrate;

an aqueous ink ink acceptor layer on the surface of said substrate, said ink acceptor layer being provided by a substantially continuous resin coating, said resin coating being about 1–200 μm thick; and a separate layer consisting essentially of powdery particles, said powdery particles being attached to the surface of said ink acceptor layer at a density of about 10–100 mg/m², wherein said recording member has a linear transmission factor of at least about 2%.

2. A light-transmissive recording member according to claim 1, wherein the powdery particles have a particle size of 20 μm or less.

3. A light-transmissive recording member according to claim 1, wherein the material constituting the powdery particles is selected from the group consisting of silicic acid, aluminum silicate, calcium silicate, clay, talc, diatomaceous earth, calcium carbonate, calcium sulfate, barium sulfate, titanium oxide, zeolite, alumina, zinc oxide, lithopone, mica, satin white, magnesium carbonate, plastic pigments, benzoguanamine resin and acrylic resin.

4. A light-transmissive recording member according to claim 1, wherein said ink acceptor layer has therein a material having dye-fixing ability.

5. A light-transmissive recording layer according to claim 1, wherein said ink acceptor layer is tacky.

6. A recording member according to claim 1, wherein said powdery particles are attached to the surface of said ink acceptor layer at a density of about 20–500 mg/m².

7. A recording member according to claim 1, wherein said recording member has a linear transmission factor of at least about 10%.

* * * * *

UNITED STATES PATENT AND TRADEMARK OFFICE
CERTIFICATE OF CORRECTION

PATENT NO. : 4,756,961  
DATED : July 12, 1988  
INVENTOR(S) : HIDEMASA MOURI, ET AL.

Page 1 of 3

It is certified that error appears in the above-identified patent and that said Letters Patent is hereby corrected as shown below:

COLUMN 10

Line 37, "30 mμm" should read --30 μm--.

COLUMN 15

Line 23, "30 mμm" should read --30 μm--.

COLUMN 17

Line 54, "15 mμm," should read --15 μm,--.

COLUMN 18

Table 1,

"
| OHP aptitude | Blocking characteristic 30° C. 65% RH | Overall evaluation |
"

should read

--
| OHP efficacy | Blocking characteristic 30° C. 65% RH | Overall evaluation |
| --- | --- | --- |
| o | o | o |
| o | o | o |
| o | o | o |
| o | o | o |
| o | o | o |
| o | o | o |
| o | o | o |
| o | o | o |

--

UNITED STATES PATENT AND TRADEMARK OFFICE
CERTIFICATE OF CORRECTION

PATENT NO. : 4,756,961

DATED : July 12, 1988

INVENTOR(S) : HIDEMASA MOURI, ET AL.

It is certified that error appears in the above-identified patent and that said Letters Patent is hereby corrected as shown below:

Table 2, " OHP  " should read --  OHP  --.
         aptitude              efficacy

O
                                  O
                                  -

Table 3,
"                                          "
           Blocking
  OHP    characteristic    Overall
aptitude   30° C. 65% RH   evaluation should read
--                                         --
           Blocking
  OHP    characteristic    Overall
efficacy   30° C. 65% RH   evaluation O           O            O
    O           O            O
    O           O            O
    O           O            O
    O           O            O
    O           O            O
    O           O            O
    O           O            O

COLUMN 19

Line 18, "ink ink" should read --ink--.
Line 25, "10-100 mg/m$^2$," should read --10-1000 mg/m$^2$,--.

UNITED STATES PATENT AND TRADEMARK OFFICE
CERTIFICATE OF CORRECTION

PATENT NO. : 4,756,961
DATED : July 12, 1988
INVENTOR(S) : HIDEMASA MOURI, ET AL.

It is certified that error appears in the above-identified patent and that said Letters Patent is hereby corrected as shown below:

COLUMN 20

Table 4, " OHP  " should read --  OHP  --.
         aptitude                  efficacy
                                      o
                                      o
            -                         -

Signed and Sealed this

Thirty-first Day of January, 1989

*Attest:*

DONALD J. QUIGG

*Attesting Officer*     *Commissioner of Patents and Trademarks*